US011182123B2

(12) United States Patent
Fischer et al.

(10) Patent No.: US 11,182,123 B2
(45) Date of Patent: Nov. 23, 2021

(54) USER-INTERFACE SYSTEM FOR A LAUNDRY APPLIANCE

(71) Applicant: WHIRLPOOL CORPORATION, Benton Harbor, MI (US)

(72) Inventors: Marcus R. Fischer, Stevensville, MI (US); Alexander Halbleib, Benton Harbor, MI (US); James Mann, St. Petersburg, FL (US); Joel M. Sells, Watervliet, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 16/812,754

(22) Filed: Mar. 9, 2020

(65) Prior Publication Data

US 2020/0348905 A1 Nov. 5, 2020

Related U.S. Application Data

(60) Provisional application No. 62/840,684, filed on Apr. 30, 2019.

(51) Int. Cl.
  *D06F 37/28* (2006.01)
  *G10L 15/22* (2006.01)
  (Continued)

(52) U.S. Cl.
  CPC .............. *G06F 3/167* (2013.01); *D06F 23/02* (2013.01); *D06F 34/08* (2020.02); *D06F 34/32* (2020.02);
  (Continued)

(58) Field of Classification Search
  CPC .......... G06F 3/167; G06F 3/016; D06F 34/32; D06F 34/08; D06F 23/02; D06F 37/28;
  (Continued)

(56) References Cited

U.S. PATENT DOCUMENTS

| | | | |
|---|---|---|---|
| 4,520,576 A | 6/1985 | Vander Molen | |
| 5,694,793 A * | 12/1997 | Nishimura | D06F 34/28 68/12.27 |

(Continued)

FOREIGN PATENT DOCUMENTS

| | | |
|---|---|---|
| CN | 207998726 U | 10/2018 |
| DE | 3503141 A1 | 8/1986 |

(Continued)

*Primary Examiner* — Beau D Spratt
(74) *Attorney, Agent, or Firm* — Price Heneveld LLP

(57) ABSTRACT

A laundry appliance includes a cabinet. A door is coupled to the cabinet. The door is operable between an opened position and a closed position. An audio interface is disposed on the door. The audio interface includes a microphone for receiving a voice command and a speaker for projecting an audio output. A visual interface is disposed on the door. The visual interface is configured to display a message in response to at least one of the voice command and the audio output. A microcontroller is disposed on the door. The microcontroller is operably coupled to the audio interface and the visual interface. A proximity sensor is configured to communicate sensed information to the microcontroller. The microcontroller is configured to activate at least one of the audio interface and the visual interface in response to the sensed information.

20 Claims, 12 Drawing Sheets

(51) Int. Cl.
  *G06F 3/16* (2006.01)
  *D06F 34/32* (2020.01)
  *D06F 34/08* (2020.01)
  *D06F 23/02* (2006.01)
  *G06F 3/01* (2006.01)
  *H04R 1/02* (2006.01)
  *H04R 1/32* (2006.01)
  *H04R 3/00* (2006.01)
  *D06F 105/60* (2020.01)

(52) U.S. Cl.
  CPC .............. *D06F 37/28* (2013.01); *G06F 3/016* (2013.01); *G10L 15/22* (2013.01); *H04R 1/028* (2013.01); *H04R 1/326* (2013.01); *H04R 3/005* (2013.01); *D06F 2105/60* (2020.02); *G10L 2015/223* (2013.01)

(58) Field of Classification Search
  CPC ................ D06F 2105/60; G10L 15/22; G10L 2015/223; H04R 1/028; H04R 1/326; H04R 3/005
  See application file for complete search history.

(56) References Cited

U.S. PATENT DOCUMENTS

| | | | |
|---|---|---|---|
| 6,549,632 B1 | 4/2003 | Akino et al. | |
| 7,342,492 B2 | 3/2008 | Ludenia | |
| 8,564,158 B2 | 10/2013 | Poyner et al. | |
| 8,627,581 B2 | 1/2014 | Brown | |
| 8,654,515 B2 | 2/2014 | Krische | |
| 8,976,126 B2 | 3/2015 | Kim et al. | |
| 9,521,475 B2 | 12/2016 | Lin et al. | |
| 10,094,065 B2 | 10/2018 | Kim et al. | |
| 10,599,392 B2 | 3/2020 | Jeon et al. | |
| 2003/0161490 A1* | 8/2003 | Maase | F24C 15/2021 381/110 |
| 2007/0298405 A1 | 12/2007 | Ebrom et al. | |
| 2008/0037275 A1 | 2/2008 | Eblenkamp et al. | |
| 2015/0192915 A1 | 7/2015 | Seo et al. | |
| 2015/0194283 A1 | 7/2015 | Hwang et al. | |
| 2015/0198940 A1* | 7/2015 | Hwang | G05B 15/02 700/90 |
| 2015/0345065 A1 | 12/2015 | Yang et al. | |
| 2016/0116891 A1 | 4/2016 | Megger et al. | |
| 2016/0258104 A1 | 9/2016 | James | |
| 2018/0305851 A1 | 10/2018 | Kwon et al. | |
| 2018/0334767 A1 | 11/2018 | Kim et al. | |
| 2019/0120546 A1* | 4/2019 | Hong | G01D 5/02 |
| 2019/0145041 A1* | 5/2019 | Bhandare | D06F 39/14 68/196 |
| 2019/0198021 A1 | 6/2019 | Lee et al. | |
| 2019/0211489 A1* | 7/2019 | An | H04R 1/025 |
| 2019/0214009 A1* | 7/2019 | An | D06F 39/00 |
| 2019/0284745 A1* | 9/2019 | Yang | D06F 37/12 |
| 2020/0020336 A1 | 1/2020 | Lee | |
| 2020/0043494 A1 | 2/2020 | Maeng | |
| 2020/0240066 A1* | 7/2020 | Ko | D06F 39/028 |
| 2020/0362497 A1* | 11/2020 | Park | G10L 15/22 |

FOREIGN PATENT DOCUMENTS

| | | |
|---|---|---|
| EP | 3263758 A1 | 1/2018 |
| EP | 3613887 A1 | 2/2020 |
| GB | 2313924 A | 12/1997 |
| JP | 6373653 B2 | 8/2018 |
| KR | 20140095779 A | 8/2014 |
| WO | 2015055239 A1 | 4/2015 |

* cited by examiner

USER-INTERFACE SYSTEM FOR A LAUNDRY APPLIANCE

CROSS-REFERENCE TO RELATED APPLICATION

This application claims priority to and the benefit under 35 U.S.C. § 119(e) of U.S. Provisional Patent Application No. 62/840,684 filed on Apr. 30, 2019, entitled "USER-INTERFACE SYSTEM FOR A LAUNDRY APPLIANCE", the entire disclosure of which is hereby incorporated herein by reference.

FIELD OF THE DISCLOSURE

The present disclosure generally relates to a user-interface system, and more specifically, a user-interface system for a laundry appliance.

BACKGROUND OF THE DISCLOSURE

Laundry appliances typically include a user-interface for a user to enter commands to control the laundry appliance. The user-interface may include a microphone, which allows the user to control the laundry appliance via voice commands. Additionally, a user-interface may include a visual indicator, such as a display screen.

SUMMARY OF THE DISCLOSURE

According to one aspect of the present disclosure, a laundry appliance includes a cabinet. A door is coupled to the cabinet. The door is operable between an opened position and a closed position. An audio interface is disposed on the door. The audio interface includes a microphone for receiving a voice command and a speaker for projecting an audio output. A visual interface is disposed on the door. The visual interface is configured to display a message in response to at least one of the voice command and the audio output. A microcontroller is disposed on the door. The microcontroller is operably coupled to the audio interface and the visual interface. A proximity sensor is configured to communicate sensed information to the microcontroller. The microcontroller is configured to activate at least one of the audio interface and the visual interface in response to the sensed information.

According to another aspect of the present disclosure, a user-interface system for a laundry appliance includes a door. An audio interface is coupled to the door. The audio interface includes at least one microphone to receive a voice command. A proximity sensor is coupled to the audio interface. The proximity sensor defines a sensor field that extends outward from a front surface of the door. A microcontroller is configured to send a signal to the audio interface after a user is detected in the sensor field for a predetermined period of time to activate the at least one microphone.

According to another aspect of the present disclosure, a door assembly for an appliance includes a door panel. An audio interface is coupled to the door panel. The audio interface is configured to receive a voice command. A tactile interface is coupled to the door panel. The tactile interface is configured to receive a user input. A visual interface is coupled to the door panel. The visual interface is configured to display a message. A microcontroller is coupled to the door panel. The microcontroller is configured to control the visual interface in response to at least one of the voice command and the user input.

These and other features, advantages, and objects of the present disclosure will be further understood and appreciated by those skilled in the art by reference to the following specification, claims, and appended drawings.

Figure 1:
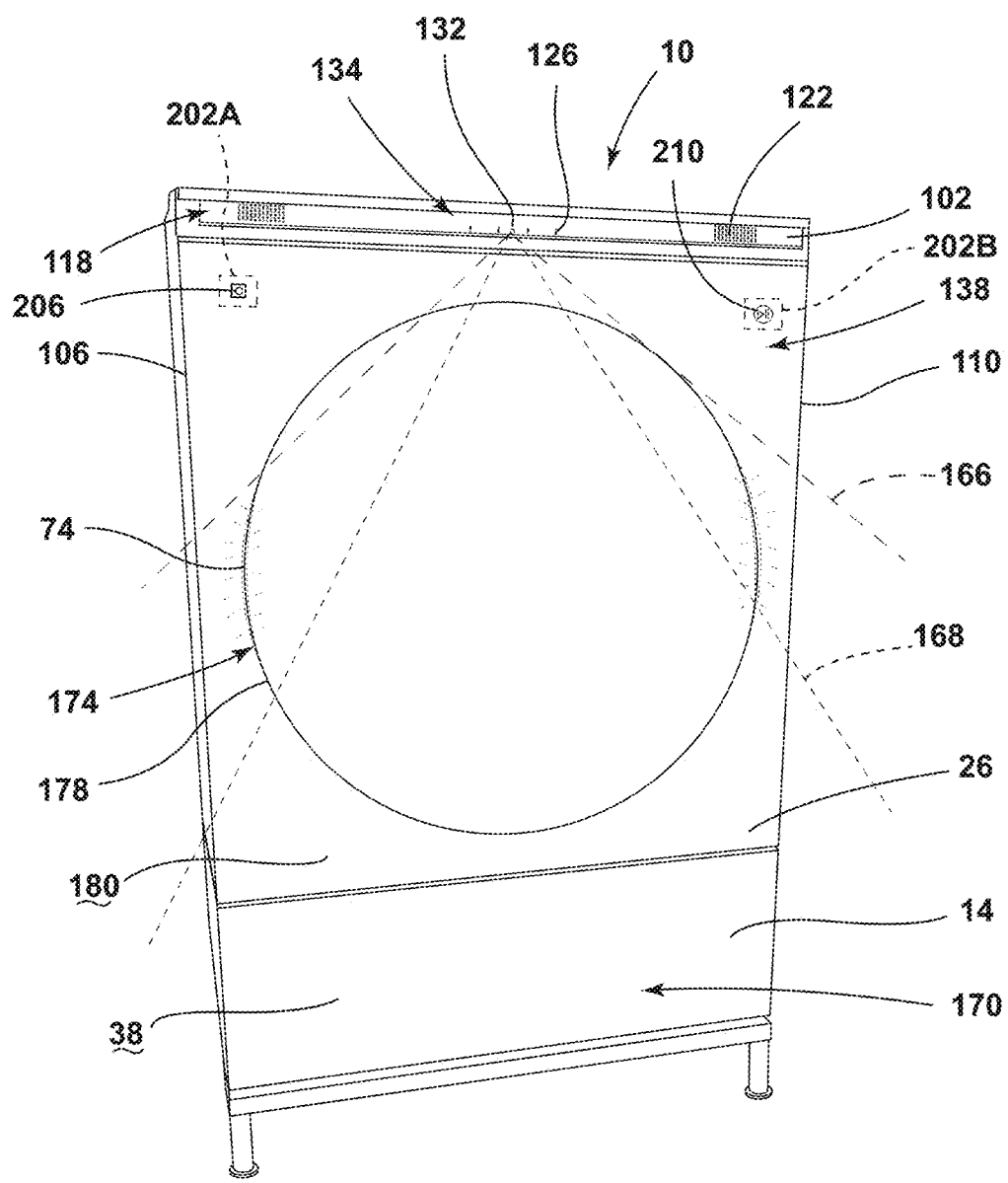
FIG. 1 is a front perspective view of a laundry appliance with a door in a closed position, according to at least one example.

The components in the figures are not necessarily to scale, emphasis instead being placed upon illustrating the principles described herein.

DETAILED DESCRIPTION

The present illustrated embodiments reside primarily in combinations of method steps and apparatus components related to a user-interface system for a laundry appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-12, reference numeral 10 generally designates a laundry appliance including a cabinet 14 and a door 26 rotatably coupled to the cabinet 14. A microphone 18 for receiving voice commands and a speaker 22 are disposed on the door 26. A microcontroller 30 is disposed on the door 26 and operably coupled to the microphone 18 and the speaker 22. A proximity sensor 34 is disposed on the door 26. The microcontroller 30 is operably coupled to the proximity sensor 34 and is configured to activate at least one of the microphone 18 and the speaker 22 in response to a signal from the proximity sensor 34.

Figure 2:
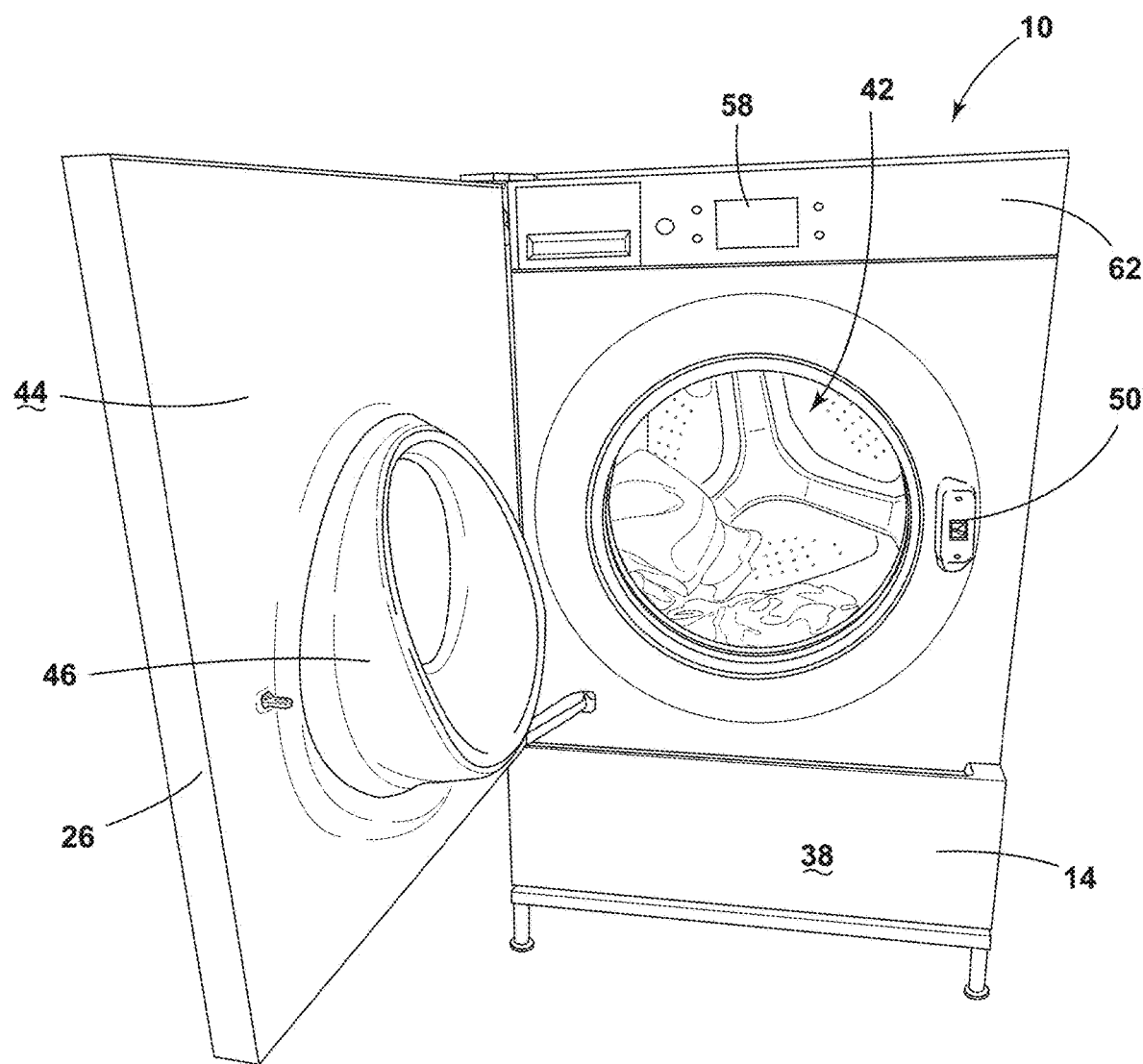
FIG. 2 is a front perspective view of the laundry appliance with the door in an opened position, according to at least one example.

Referring to FIGS. 1 and 2, the laundry appliance 10 includes the cabinet 14 having a front surface 38 and the door 26 rotatably coupled to the cabinet 14. The door 26 may be a flat panel door, a fishbowl-style door, and/or a combination thereof. As illustrated in the exemplary embodiment in FIG. 1, the laundry appliance 10 is a front-load, horizontal axis laundry appliance 10. However, the laundry appliance 10 can be any type of a washer, dryer, and/or a combination thereof, such as, for example, a top-load laundry appliance 10 or another configuration of a front-load laundry appliance 10.

The door 26 (e.g., a door panel) is operable between opened and closed positions. The door 26, in the exemplary embodiment of FIG. 1, opens in a side-to-side manner (e.g., sliding, rotating about a vertical axis, etc.), however, it is contemplated that the door 26 may open in an up-and-down manner (e.g., sliding, rotating about a horizontal axis, etc.). The door 26 is configured to allow access to a drum 42 positioned within the cabinet 14 when in the opened position and encloses the drum 42 when in the closed position.

In various examples, the door 26 has a substantially rectangular shape. The shape of the door 26 can substantially align with the shape of the cabinet 14. In other words, the door 26 and the front surface 38 of the cabinet 14 can have substantially similar shapes. Alternatively, the door 26 and the front surface 38 of the cabinet 14 may have different shapes, such as a substantially rectangular front surface 38 and an oblong or circular door 26. In certain aspects, an interior surface 44 of the door 26 typically defines and/or includes a deflector 46, in particular, when the appliance includes a laundry washing function. When the door 26 is in the closed position, the deflector 46 extends into the drum 42 via an opening 50 defined in the front surface 38 of the cabinet 14. The deflector 46 is advantageous for deflecting laundry away from the door 26 or a bellows assembly, which is positioned about a perimeter of the opening 50 of the cabinet 14.

Figure 3:
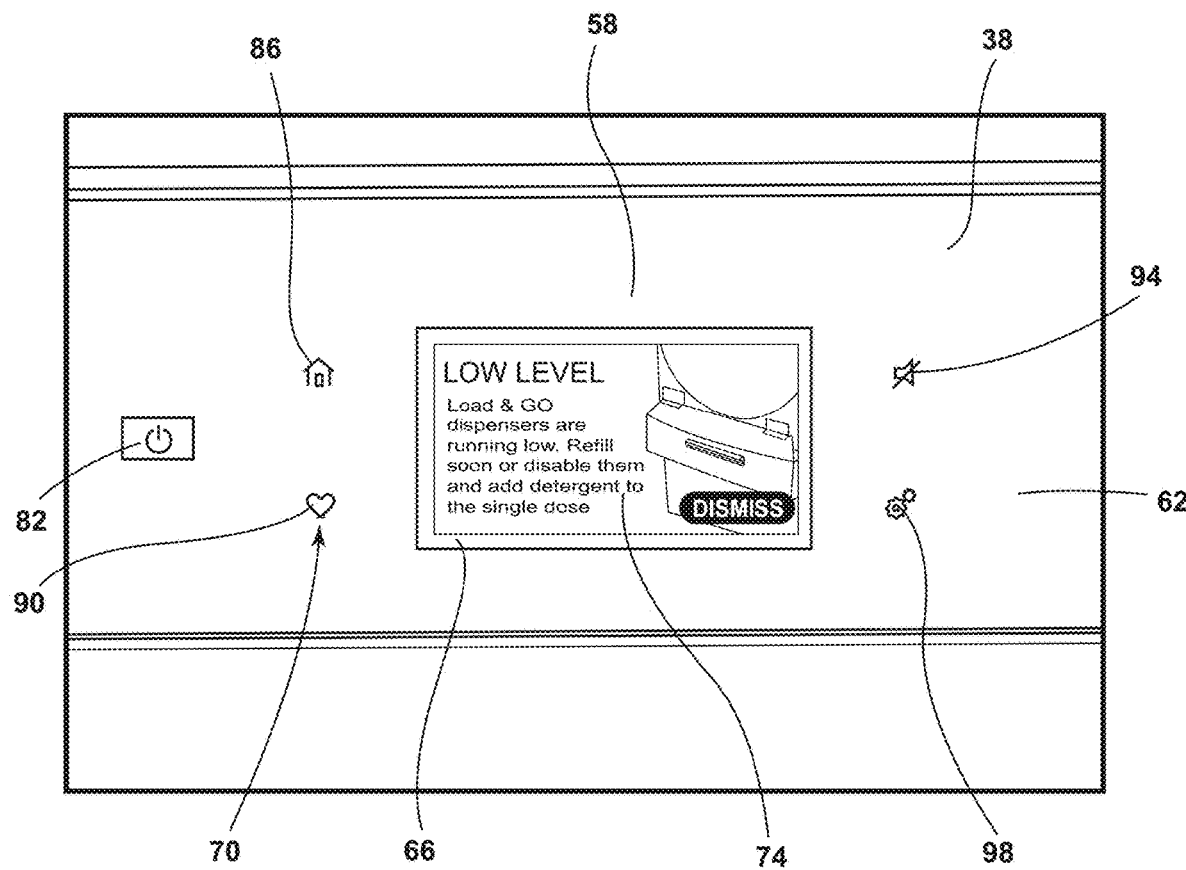
FIG. 3 is an enlarged view of a human-machine interface on a cabinet of the laundry appliance, according to at least one example.
Figure 4:
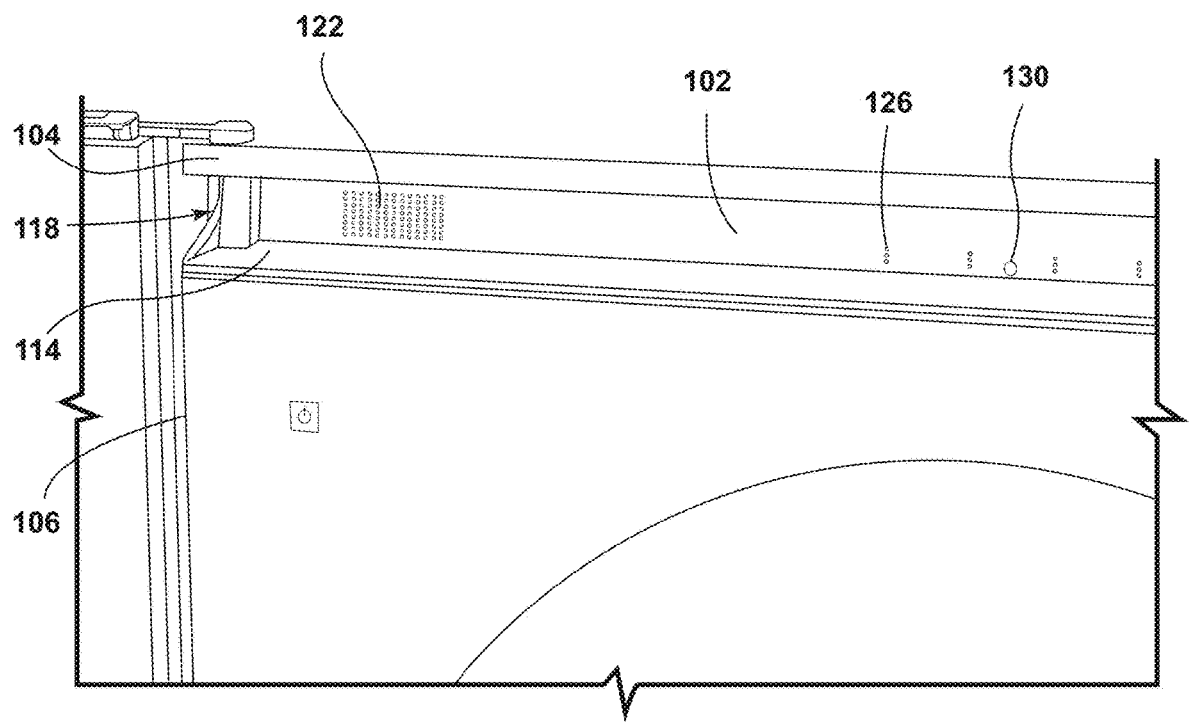
FIG. 4 is an enlarged partial view of an audio interface and a tactile interface of the laundry appliance, according to at least one example.
Figure 5:
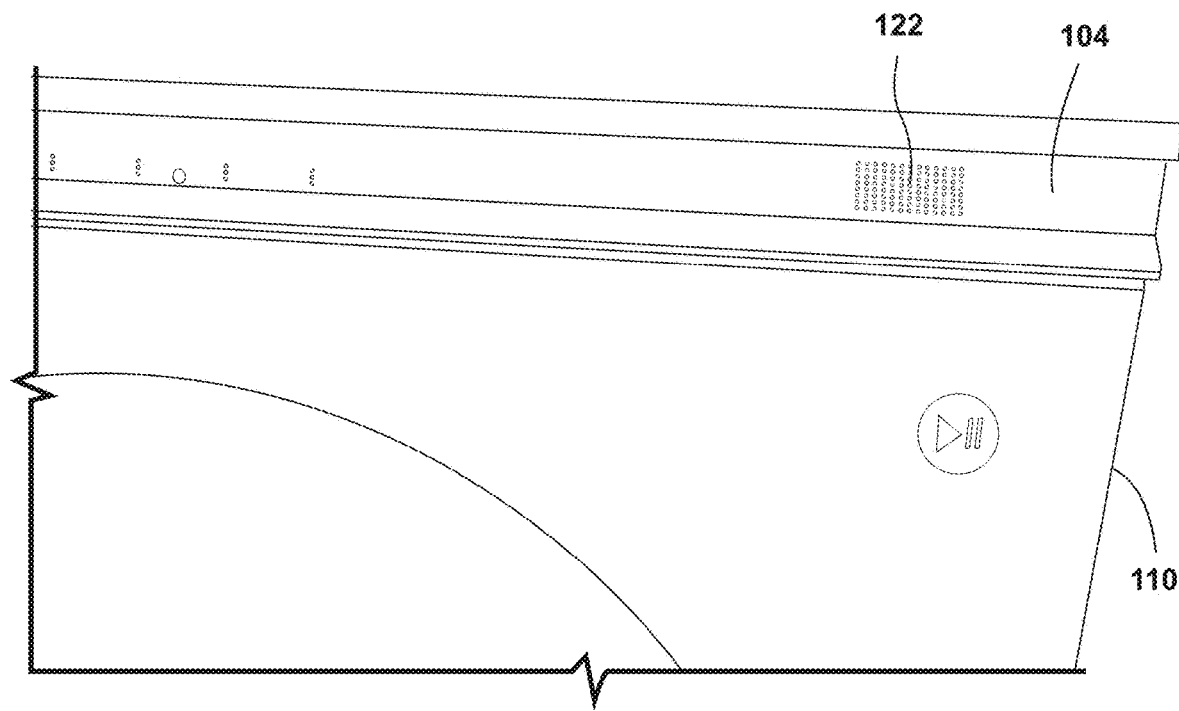
FIG. 5 is an enlarged partial view of the audio interface and the tactile interface of the laundry appliance, according to at least one example.

Referring to FIGS. 2 and 3, the front surface 38 of the cabinet 14 includes a human-machine interface (HMI) 58. As illustrated, the HMI 58 is positioned on an upper edge portion 62 of the front surface 38 of the cabinet 14 above the opening 50. However, it is contemplated that the HMI 58 may be positioned elsewhere on the cabinet 14 of the laundry appliance 10, without departing from the teachings herein. The HMI 58 includes a display screen 66 and a plurality of buttons 70. The display screen 66 is configured to display various messages 74 to a user. For example, the messages 74 can relate to the status of the laundry appliance 10, including levels of laundry detergent or other chemistry or a status of a laundry wash or dry cycle. The HMI 58 is typically configured as a touch panel, such that the user can touch the display screen 66 or one of the plurality of buttons 70 to choose a selected function.

Figure 11:
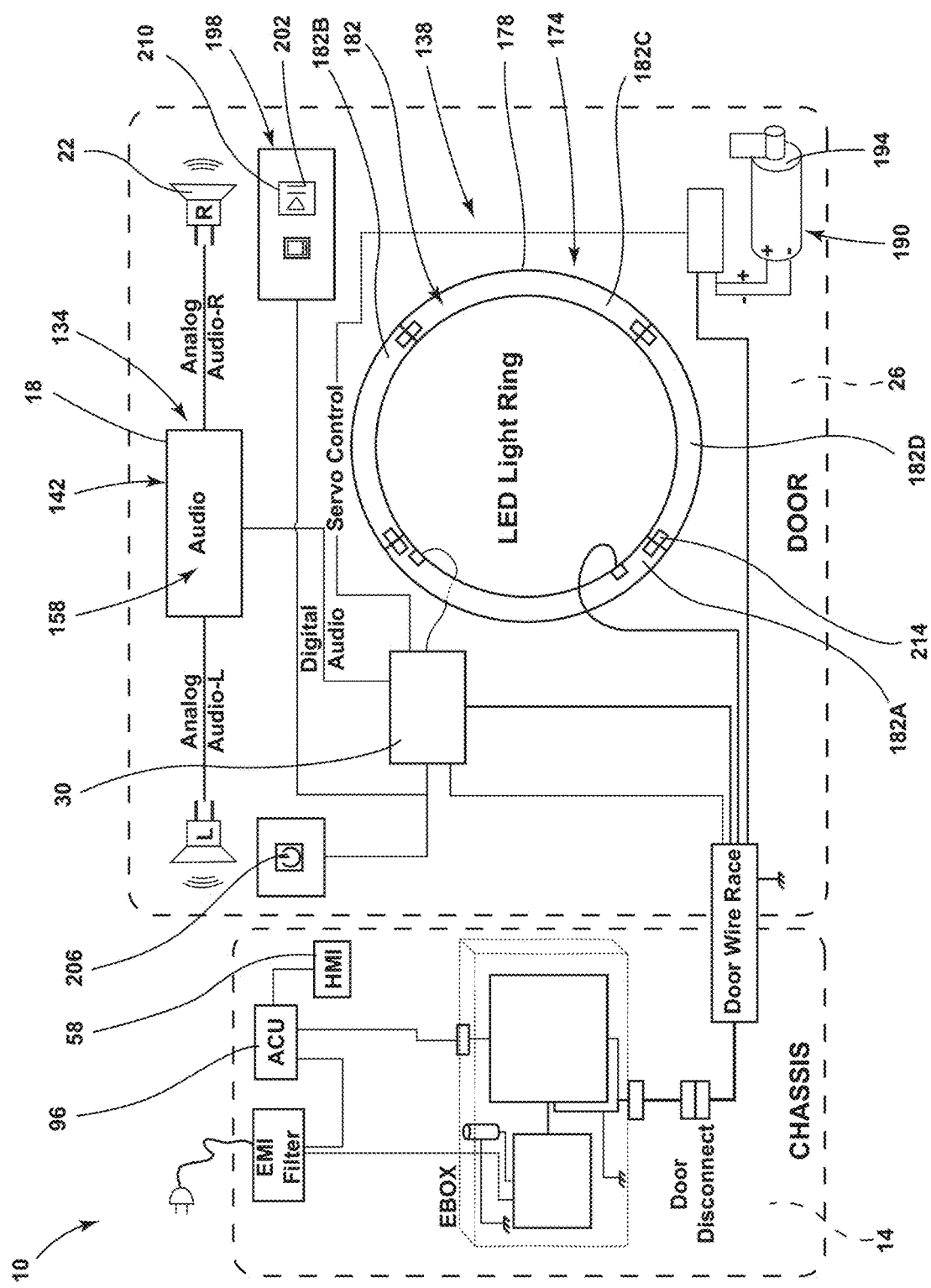
FIG. 11 is a schematic view of the laundry appliance and a user-interface system, according to at least one example.

The plurality of buttons 70 typically includes at least an HMI power button 82, a home button 86, a favorites button 90, a sound button 94, and a settings button 98. The HMI power button 82 is configured to activate and deactivate the HMI 58. The HMI power button 82 may also be configured to switch the HMI 58 to a power-saving mode. The home button 86 changes the display screen 66 to a home display screen. The home display screen often includes various information or other selectable buttons 70 for the user to choose from and select. The home display screen may be adjustable by the user to provide a customizable home display screen. The favorites button 90 shows a list of saved wash and/or dry cycles for quick access for the user. The saved wash and/or dry cycles are typically saved within a memory of a controller 96 (FIG. 11). The sound button 94 activates, modifies, and/or deactivates audio outputs of the laundry appliance 10. The audio outputs from the laundry appliance 10 projected via the speakers 22 (FIG. 11) can include current wash and/or dry settings, approximate end time of the laundry cycle, and other audio signals relating to the status of the laundry appliance 10 and/or laundry cycle. The sound button 94 also adjusts the volume of the audio output. Additionally, the settings button 98 provides a list of settings for the user to choose from and adjust. The settings often relate to the HMI 58, the display screen 66, audio outputs, audio inputs (e.g., voice commands), laundry cycles, visual signals, etc.

Referring to FIGS. 1-3, when the door 26 is in the opened position, the HMI 58 is manually accessible to the user. When the door 26 is in the closed position, the door 26 is positioned in front of the HMI 58, such that the user is typically unable to manually access the HMI 58 without moving the door 26. The concealment of the HMI 58 behind the door 26 provides a uniform aesthetic for the laundry appliance 10 when the door 26 is in the closed position. The HMI 58 is also advantageous for providing an auxiliary point of control when the door 26 is in the opened position.

Referring now to FIGS. 1 and 4-6, the door 26 includes a handle 102 that is typically defined proximate to a top edge 104 of the door 26. It is also contemplated that the handle 102 may be located in other locations on the door 26, such as, for example, proximate to a right or left side edge 106, 110 of the door 26. A cover member 114 at least partially defines an elongated channel 118 proximate the handle 102. The elongated channel 118 is defined between the door 26 and the cover member 114. The cover member 114 defines speaker apertures 122, microphone apertures 126, and a sensor aperture 130 configured to align with the speakers 22, the microphones 18, and a proximity sensor 34, respectively. The speaker apertures 122 are defined in the cover member 114 typically proximate to the right and left side edges 106, 110 of the door 26. The microphone apertures 126 and the sensor aperture 130 are typically defined proximate a center portion 132 of the cover member 114. The positioning of the microphone apertures 126 adjacent to the microphones 18 allows more sound to reach the microphone 18 and, therefore, increases the reliability of an audio interface 134 of the laundry appliance 10. The positioning of the speaker apertures 122 adjacent to the speakers 22 typically provides similar advantages of increasing the reliability and clarity of the audio output and, therefore, increases the reliability of the audio interface 134.

Figure 6:
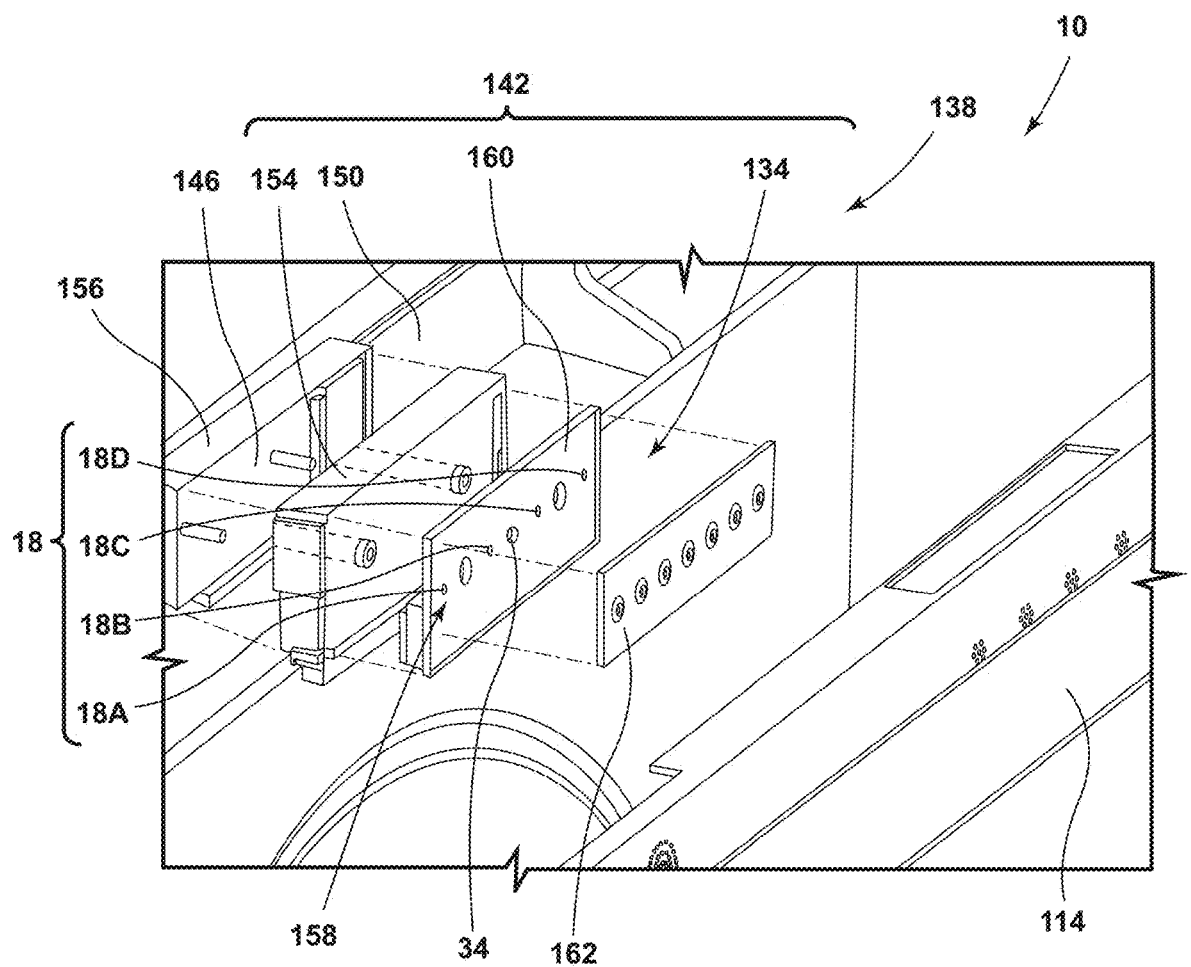
FIG. 6 is an exploded perspective view of a microphone assembly of the audio interface, according to at least one example.

Referring to FIGS. 1 and 6, the laundry appliance 10 includes a user-interface system 138 that includes the audio interface 134 attached to the door 26. The audio interface 134 includes a microphone assembly 142 positioned within the elongated channel 118 and proximate the handle 102 of the door 26. As illustrated, a pocket 146 is defined in a rear surface 150 of the elongated channel 118 within the door 26. The pocket 146 can be defined in the rear surface 150, or alternatively, can be formed by a raised border or frame 156 attached to the rear surface 150.

A locating gasket 154 is positioned within the pocket 146. The microphone assembly 142 includes the locating gasket 154, a microphone printed circuit board (MPCB) assembly 158 coupled to the locating gasket 154, and an acoustic layer 162. The microphone assembly 142 is disposed within the elongated channel 118 between the door 26 and the cover member 114. The locating gasket 154 is advantageous for properly positioning the MPCB assembly 158. Proper alignment of the MPCB assembly 158 is advantageous for increasing the reliability of the audio interface 134 by reducing interference between a voice command and the microphone assembly 142. The MPCB assembly 158 includes a printed circuit board (PCB) 160, at least one microphone 18 disposed on the PCB 160, and the proximity sensor 34 disposed on the PCB 160.

The MPCB assembly 158 is typically centrally located within the elongated channel 118, and therefore, centrally located on the laundry appliance 10. The MPCB assembly 158 typically includes four microphones 18A-18D, collectively referred to as the microphones 18, spaced at substantially equidistant intervals laterally across the MPCB assembly 158. The proximity sensor 34 is coupled to the MPCB assembly 158. In various examples, the proximity sensor 34 is positioned among the microphones and typically in a center of the four microphones 18 (e.g., between microphones 18B, 18C). The centralized location of the proximity sensor 34 is advantageous for providing a centralized sensor field 166 extending from the laundry appliance 10. However, it is contemplated that the proximity sensor 34 may be positioned elsewhere in the handle 102 and/or the door 26 of the laundry appliance 10.

Referring to FIGS. 1-7, the audio interface 134 may have different configurations. For example, a back surface 164 of the cover member 114 defines mounting bosses 172 extending towards the rear surface 150 of the elongated channel 118 when the door 26 is assembled. In such configurations, the MPCB assembly 158 defines mounting apertures 176 configured to correspond and align with the mounting bosses 172 of the cover member 114. Additionally or alternatively, the acoustic layer 162 includes gaskets 162A-162E. Each of the gaskets 162A-162D is configured to be positioned adjacent to one of the microphones 18A-18D of the MPCB assembly 158, respectively, and the gasket 162E is configured to be positioned over the proximity sensor 34.

Figure 7:
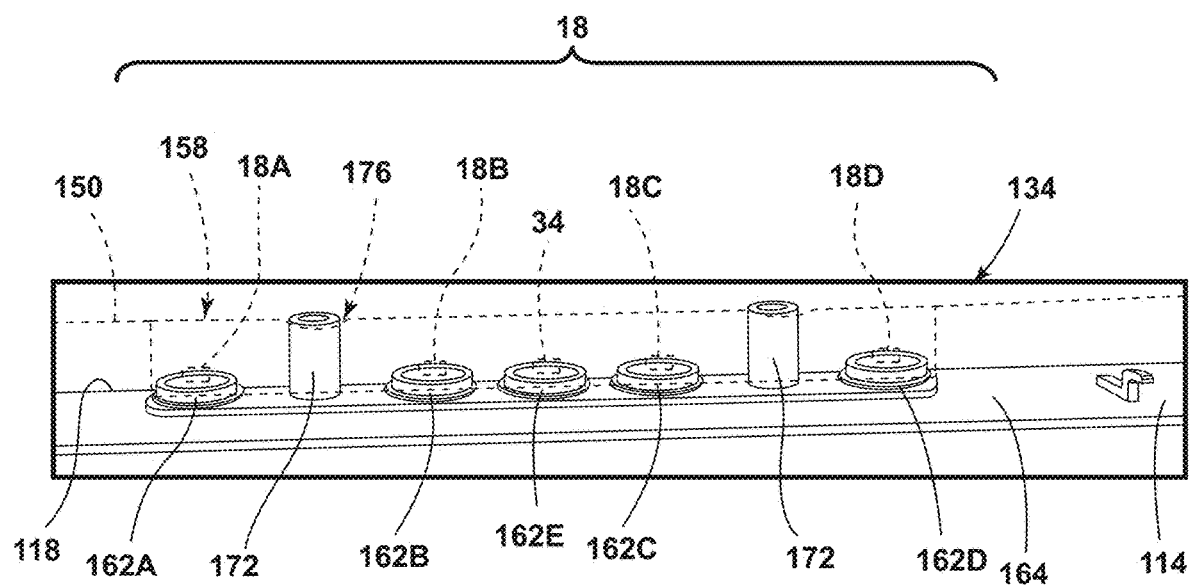
FIG. 7 is a partial bottom view of a handle of the door including a microphone assembly, according to at least one example.

When assembled, the MPCB assembly 158 may be compressed between the cover member 114 and the rear surface 150 of the door. The MPCB assembly 158 is retained in position by the cover member 114, the mounting bosses 172, and the rear surface 150. The exemplary embodiments of the audio interface 134, as illustrated in FIGS. 6 and 7, may both be configured to accomplish the same goals of reducing interference with the microphone assembly 142 (e.g., vibrations from the laundry appliance 10) and increasing reliability of the audio interface 134 by reducing interference with sound waves traveling to the microphones 18.

Figure 8:
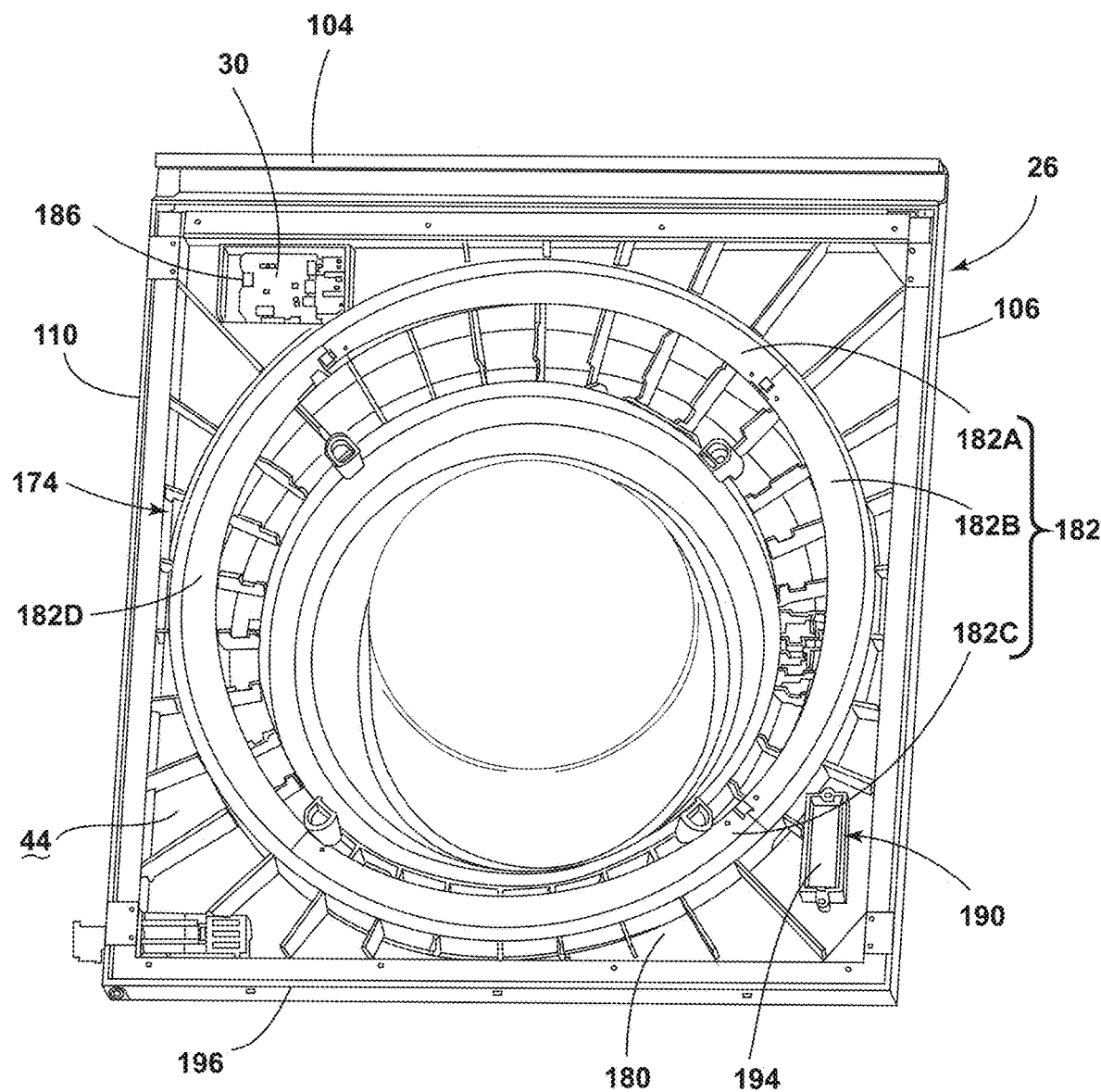
FIG. 8 is a rear perspective view of the door of the laundry appliance with a rear panel removed, according to at least one example.

Referring to FIGS. 1, 6, and 8, the microphones 18 and the proximity sensor 34 of the MPCB assembly 158 are configured to align with the microphone apertures 126 and the speaker apertures 122 defined by the cover member 114, respectively. The proximity sensor 34 defines the sensor field 166 extending outward to a front 170 of the laundry appliance 10. Accordingly, the proximity sensor 34 senses when a person enters and/or exits the sensor field 166. The sensor field 166 may extend at or near the front 170 of the laundry appliance 10 to a range of from about one meter to about six meters from the front 170 of the laundry appliance 10. The proximity sensor 34 may be, for example, an IR distance sensor or other motion detectors.

Additionally or alternatively, the proximity sensor 34 and/or the microcontroller 30 may include a temporal aspect. In such configurations, the proximity sensor 34 sends a signal to the microcontroller 30 after the user is sensed in the sensor field 166 for a predetermined amount of time. The temporal aspect is advantageous for differentiating between a user intending to use the laundry appliance 10, a person quickly checking on the laundry appliance 10, a person passing through the sensor field 166 without intending to engage or use the laundry appliance 10, and assessing the appropriate time to provide an audio or visual alert.

The temporal aspect is also advantageous for differentiating between a user and an object positioned adjacent to the front 170 of the laundry appliance 10. For example, if the laundry appliance 10 is positioned within a room or closet and a closet door is closed to conceal the laundry appliance 10, the vibrations of the laundry appliance 10 may result in the proximity sensor 34 sensing movement of the closet door relative to the laundry appliance 10. In such examples, the temporal aspect of the proximity sensor 34 and/or the microcontroller 30 allows the microcontroller 30 to differentiate between the closet door and a user approaching the laundry appliance 10. Accordingly, the temporal aspect may be configured such that the proximity sensor 34 sends a signal to the microcontroller 30, or the microcontroller 30 responds to the signal, after the object or person in the sensor field 166 is sensed or detected for a predetermined amount of time, or within a predetermined range of time.

Alternatively, the temporal aspect of the user-interface system 138 may be included in the microcontroller 30. The microcontroller 30 may include a processor, other control circuitry, and the memory. Routines or instructions are stored in the memory and executable by the processor. The memory stores various instructions relating to various functions. For example, the instructions typically include at least one instruction relating to determining if a user intends to issue a voice command to the laundry appliance 10 in response to a signal from the proximity sensor 34. If the proximity sensor 34 senses a sharp increase and decrease in the distance of a user relative to the laundry appliance 10, the microcontroller 30 is configured to determine that the user is passing by the front 170 of the laundry appliance 10. Accordingly, in such a condition, the microcontroller 30 is configured to determine that the user may not intend to issue a voice command. Alternatively, if the proximity sensor 34 senses a gradual decrease in distance between the user and the laundry appliance 10, the microcontroller 30 may be configured to determine that the user intends to address the laundry appliance 10 and/or issue a voice command. In a non-limiting example, the microcontroller 30 may respond to a signal from the proximity sensor 34 after determining that the user is within the sensor field 166 for a predetermined period of time or a predetermined range of time. The proximity sensor 34 and/or the microcontroller 30 can also be used to assess a time that is appropriate for communicating an alert so that it is likely to be received.

Figure 9:
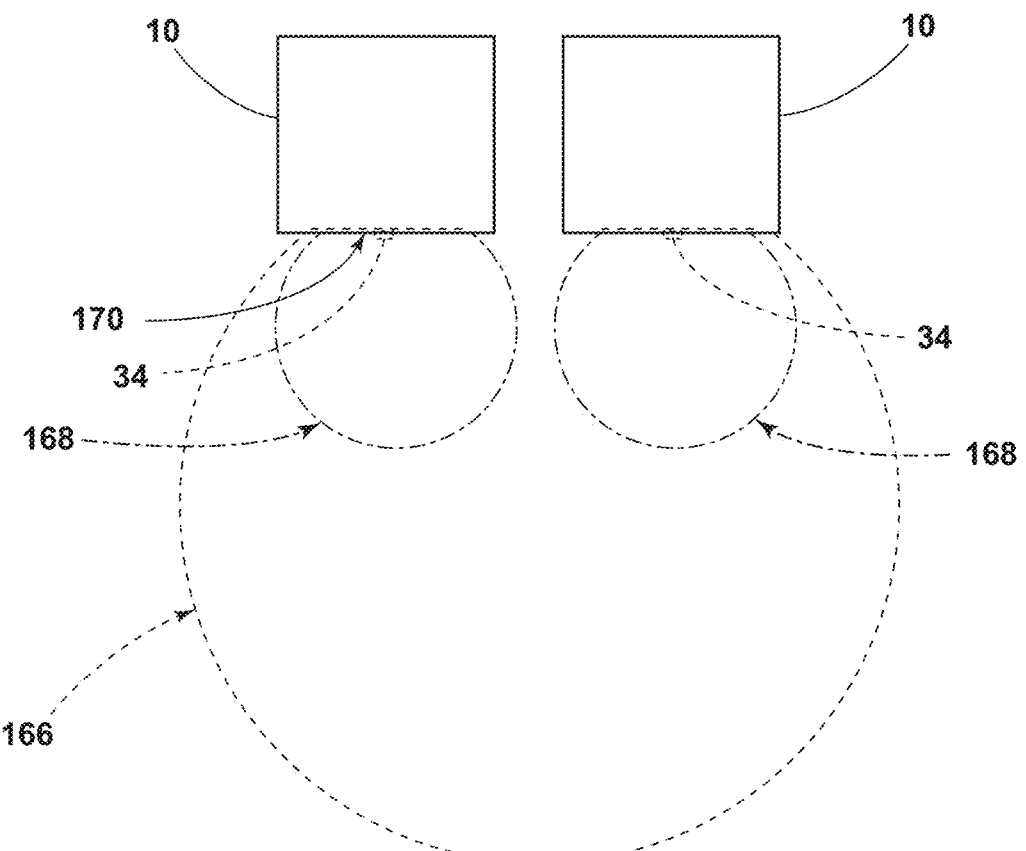
FIG. 9 is a schematic view of a sensor field and low distance sensor fields of adjacent laundry appliances, according to at least one example.
Figure 10:
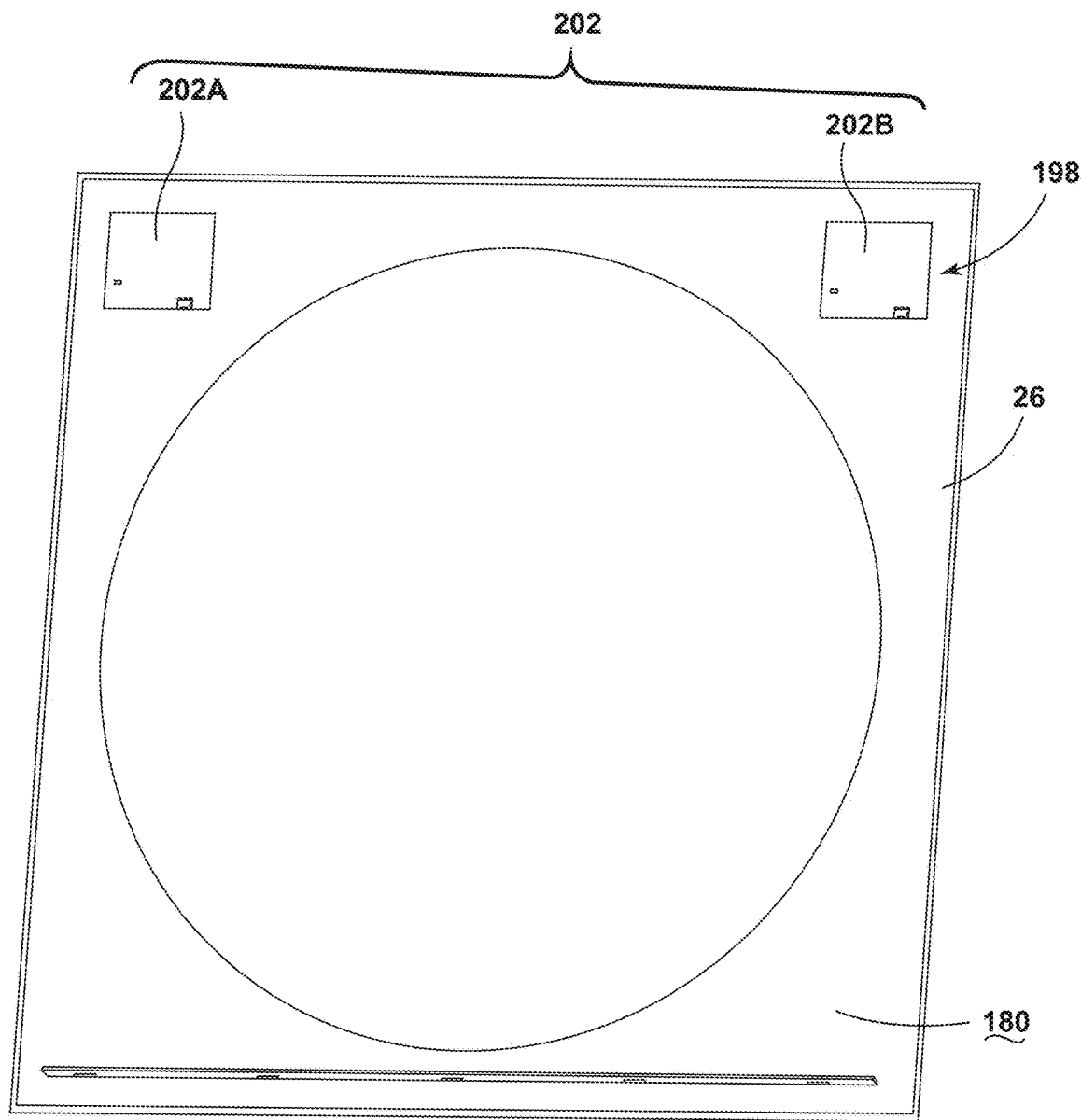
FIG. 10 is a front perspective view of the tactile interface of the door, according to at least one example.

In various examples, as exemplified in FIG. 9, the proximity sensor 34 often includes a low-distance mode. In such examples, the proximity sensor 34 includes a low-distance sensor field 168 that extends a shorter distance from the front 170 of the laundry appliance 10. In other words, the proximity sensor 34 includes the low-distance sensor field 168 and the primary sensor field 166, which extends a greater distance than the low-distance sensor field 168. Compared to the sensor field 166, a sensed user in the low-distance sensor field 168 can indicate to the microcontroller 30 (FIG. 11) that the user is addressing or intends to address the laundry appliance 10. The low-distance mode of the proximity sensor 34 also allows a user to address one laundry appliance 10 and not an adjacent or proximate laundry appliance 10. The microcontroller 30 activates various components of the user-interface system 138 (FIG. 6) in response to a signal from the proximity sensor 34 that a user is in the low-distance sensor field 168. It is also contemplated that the low-distance mode can allow the microcontroller 30 to differentiate a voice command to the laundry appliance 10 and a user speaking about the laundry appliance 10, which is not intended to be a voice command.

Referring again to FIGS. 1 and 8, the user-interface system 138 typically includes a visual interface 174 for conveying messages 74 to the user. The visual interface 174 is positioned on the door 26 of the laundry appliance 10. Typically, the visual interface 174 is coupled to the interior surface 44 of the door and configured to illuminate and/or display a message 74 through an outer surface 180 of the door 26. The visual interface 174 defines the message 74 and/or an illuminated indicia, such as a light ring 178 on the outer surface 180 of the door 26. While illustrated in FIG. 8 as a light ring 178, the visual interface 174 may define any shape, plurality of shapes, symbols, or words without departing from the teachings herein. The visual interface 174 includes at least one light printed circuit board (LPCB) assembly 182 coupled to the interior surface 44 of the door 26. In the non-limiting example illustrated in FIG. 8, the visual interface 174 includes four LPCB assemblies 182A-182D, collectively referred to as 182. Each LPCB assembly 182 is configured as a quarter-circle and coupled together to form the circular and/or oblong light ring 178. At least one of the LPCB assemblies 182A-182D is operably and/or electrically coupled to the microcontroller 30. Accordingly, the LPCB assemblies 182 are activated and deactivated by the microcontroller 30.

Referring to FIGS. 1, 2, 6, and 8, the microcontroller 30 is typically coupled to the interior surface 44 of the door 26 within an enclosure 186. The enclosure 186 is advantageous to reduce and/or limit exposure of the microcontroller 30 to heat and moisture produced by the laundry appliance 10 and/or an external environment. The microcontroller 30 is typically positioned proximate one side, such as the left side edge 110, and the top edge 104 of the door 26 but may be positioned elsewhere on the door 26. The microcontroller 30 may be configured as a "Raspberry Pi®" or other configurations of single-board computers. The microcontroller 30 is operably coupled to the LPCB assemblies 182, the microphone assembly 142, the proximity sensor 34, and/or the HMI 58. Accordingly, the microcontroller 30 is operably coupled to the audio interface 134 and the visual interface 174 of the laundry appliance 10.

Referring still to FIG. 8, a door opening assembly 190 may be coupled to the interior surface 44 of the door 26. The door opening assembly 190 includes a motor 194, which is illustrated adjacent to the right side edge 106 and a bottom edge 196 of the door 26, however, the door opening assembly 190 may be positioned elsewhere on the door 26. The door opening assembly 190 is operably coupled to the microcontroller 30. The microcontroller 30 is configured to activate and deactivate the door opening assembly 190. When the door 26 is in the closed position, the microcontroller 30 can activate the door opening assembly 190 to adjust the door 26 to the opened position. The distance the door 26 is opened depends on the configuration of the door opening assembly 190. When the door 26 is opened, the microcontroller 30 can deactivate the door opening assembly 190. The door opening assembly 190 may also operate to move the door 26 to the closed position.

Referring to FIGS. 1, 6, 8, and 10, the user-interface system 138 includes a tactile interface 198 disposed on the door 26. The tactile interface 198 includes at least one touch printed circuit board (TPCB) assembly 202. The tactile interface 198 includes two TPCB assemblies 202A, 202B, collectively referred to as the TPCB assemblies 202, positioned adjacent to the right and left side edges 106, 110, and the top edge 104 of the door 26, respectively. The TPCB assemblies 202 are typically accessible via the outer surface 180 of the door 26. The TPCB assemblies 202 may provide for a capacitive touch response when configured as a capacitive touch feature. Typically, the TPCB assemblies 202 correspond with a power button 206 and a start button 210 on the outer surface 180 of the door 26. The TPCB assemblies 202 are operably coupled to the microcontroller 30. Accordingly, the microcontroller 30 is operably coupled to each of the audio, visual, and tactile interfaces 134, 174, 198 of the user-interface system 138.

Referring to FIGS. 1 and 11, the user-interface system 138 is positioned at least partially within the door 26 of the laundry appliance 10. Typically, the electrical and mechanical components of the user-interface system 138 are positioned entirely within the door 26. As previously explained, the microcontroller 30 is operably coupled to the audio interface 134. In such examples, the microcontroller 30 is coupled to the microphones 18 and/or the MPCB assembly 158 of the microphone assembly 142. The MPCB assembly 158 and/or the microcontroller 30 may be operably or electrically coupled to the speakers 22. The microcontroller 30 operates to activate and deactivate the speakers 22 and the microphones 18 of the microphone assembly 142.

The microcontroller 30 is coupled to the visual interface 174. In various examples, the microcontroller 30 is operably coupled to at least one LPCB assembly 182 of the visual interface 174. For example, the microcontroller 30 can be electrically coupled with the LPCB assembly 182A. The LPCB assembly 182A is electrically coupled to each of the adjacent LPCB assemblies 182B, 182D via electrical connectors 214. The LPCB assemblies 182B, 182D are electrically coupled to the LPCB assembly 182C via the electrical connectors 214. In this way, an electrical connection is provided to each of the LPCB assemblies 182, which allows the microcontroller 30 to selectively activate and deactivate each of the LPCB assemblies 182. Each LPCB assembly 182 includes two electrical connectors 214 that mate with the electrical connectors 214 of the adjacent LPCB assemblies 182. For example, each LPCB assembly 182 typically includes one female electrical connector and one male electrical connector providing for a continuous connection of the LPCB assemblies 182. The microcontroller 30 operates to activate and deactivate the LPCB assemblies 182 of the visual interface 174 to convey a message 74 to a user via the light ring 178 on the door 26.

Referring still to FIG. 11, the microcontroller 30 is operably connected to the tactile interface 198. Accordingly, the microcontroller 30 is coupled to the TPCB assemblies 202 configured as the power button 206 and the start button 210. In such examples, the TPCB assemblies 202 send signals, respectively, to the microcontroller 30 indicating that a user has touched and/or pressed the power and/or start buttons 206, 210. In certain aspects of the device, the microcontroller 30 is operably coupled to the door opening assembly 190. In such examples, the microcontroller 30 may activate and deactivate the motor 194 of the door opening assembly 190.

Referring to FIGS. 1, 2, 3, and 11, the user-interface system 138 is positioned on the door 26 and is operably coupled to the cabinet 14 of the laundry appliance 10. In various examples, the microcontroller 30 is operably coupled to the HMI 58 positioned on the cabinet 14 to provide a link between the user-interface system 138 on the door 26 and the HMI 58. Accordingly, the HMI 58 is configured to update the display screen 66 based on information conveyed via the audio, visual, and/or tactile interfaces 134, 174, 198. The controller 96 is positioned within the cabinet 14 of the laundry appliance 10. The controller 96 is configured to control the operation of the laundry appliance 10. For example, the controller 96 can start and stop the wash and/or dry cycles of the laundry appliance 10. The controller 96 can receive a signal from the HMI 58 regarding the user selections from the user-interface system 138 and/or the HMI 58. Typically, the controller 96 begins the operation of a laundry cycle after the user physically engages the tactile interface 198 (e.g., the start button 210) of the user-interface system 138, which provides confirmation of a user command.

Figure 12:
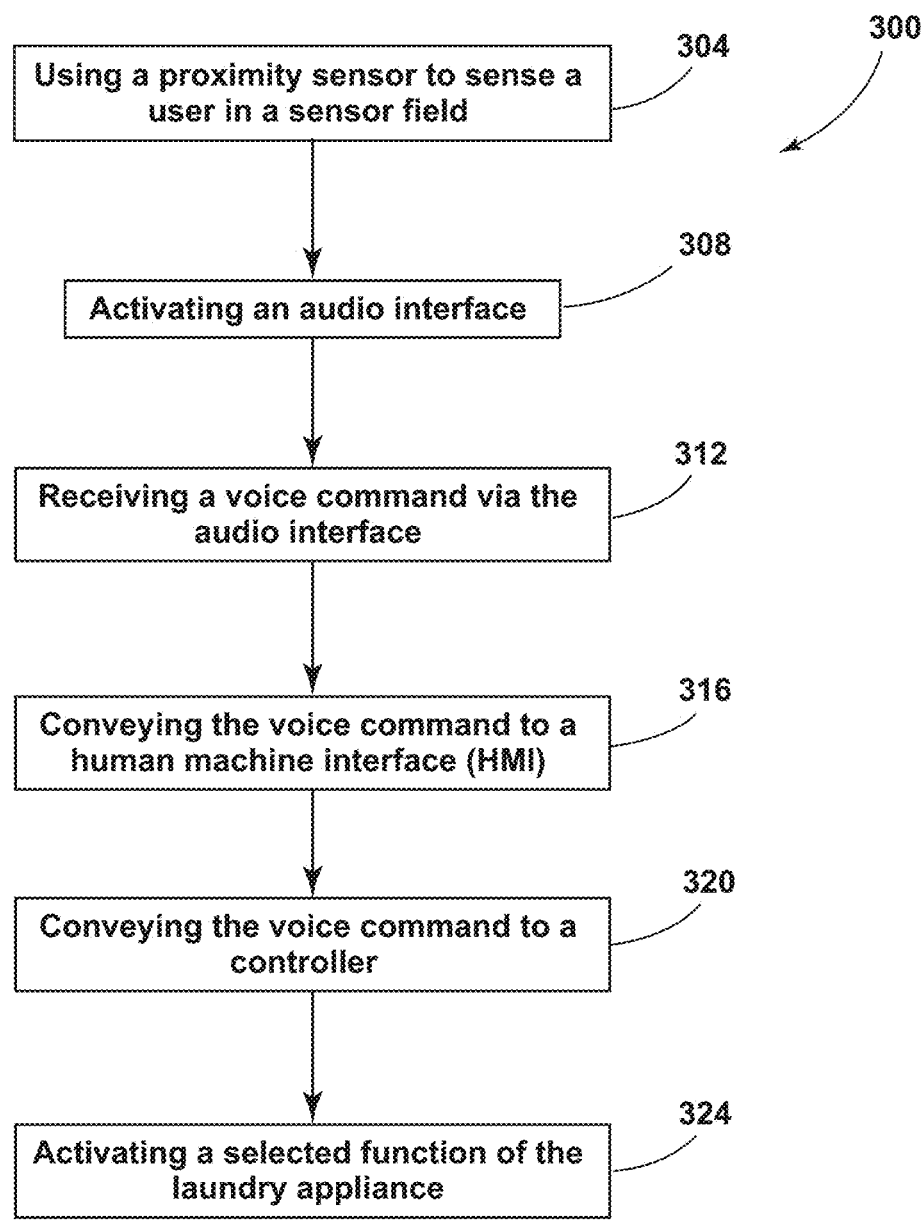
FIG. 12 is a flow diagram of a method of controlling the laundry appliance via voice command, according to at least one example.

Referring to FIG. 12, and with further reference to FIGS. 1-11, in operation, the various components of the user-interface system 138 are interconnected. A method 300 for controlling the laundry appliance 10 includes a step 304 of using the proximity sensor 34 to sense the user in the sensor field 166. For example, when the proximity sensor 34 senses a user approaching and/or stopping proximate to the front 170 of the laundry appliance 10, the proximity sensor 34 communicates sensed information to the microcontroller 30 indicating a sensed presence within the sensor field 166 and/or the low-distance sensor field 168.

Step 308 of the method 300 includes activating the audio interface 134 in response to the sensed information of the proximity sensor 34. Step 308 includes the proximity sensor 34 sending a signal to the microcontroller 30, which then sends a corresponding signal to activate the audio interface 134. In various examples, step 308 includes the temporal aspect of the proximity sensor 34 and/or the microcontroller 30. In such examples, the temporal aspect is typically satisfied before the proximity sensor 34 sends a signal to the microcontroller 30. In other words, the proximity sensor 34 can sense the user in the sensor field 166 for a predetermined amount of time before the proximity sensor 34 sends a signal to the microcontroller 30. Additionally or alternatively, the microcontroller 30 can receive the signal from the proximity sensor 34 and send the corresponding signal to the audio interface 134 after the predetermined amount of time has elapsed with the user in the sensor field 166 and/or the low-distance sensor field 168. The microcontroller 30 then activates the microphones 18 of the microphone assembly 142 and/or the speakers 22.

Step 312 includes receiving the voice command via the audio interface 134. Accordingly, the microphones 18 are configured to receive a voice command from the user. Once activated, the microphones 18 may be configured to receive a "wake" command from the user to indicate to the user-interface system 138 that the user may be issuing a voice command. Additionally or alternatively, the user-interface system 138 can present options and/or settings for the user via the speakers 22. For example, if a voice command from the user indicates to wash laundry, the user-interface system 138 may present the current setting for the laundry cycle and the approximate end time of the laundry cycle. Additionally or alternatively, the user-interface system 138 may request confirmation from the user to proceed with the settings indicated via the speakers 22 and/or the visual interface 174.

Step 312 may also include activating the visual interface 174. In various examples, when the proximity sensor 34 sends a signal to the microcontroller 30, the microcontroller 30 selectively activates one or more of the LPCB assemblies 182 that defines the light ring 178 of the visual interface 174, independently of or in combination with the audio interface 134. The LPCB assemblies 182 activate to illuminate the light ring 178 to indicate to the user that the microphone assembly 142 is ready to receive a voice command. The visual interface 174 can also illuminate in response to the "wake" command from the user. Such illumination after a "wake" command indicates to the user that the microphones 18 are configured to receive the subsequent voice command regarding the operation of the laundry appliance 10. It is also contemplated that two adjacent laundry appliances 10 may have different "wake" commands, such that a user can give a voice command to one laundry appliance 10 and not the other. Additionally or alternatively, the visual interface 174 can indicate to the user that the proximity sensor 34 senses the user in the sensor field 166 and/or the low-distance sensor field 168. In such examples, the visual interface 174 typically presents animation to indicate the proximity of the user to the laundry appliance 10. The animation or pattern of light may differ based on the distance of the user to the laundry appliance 10.

Additionally or alternatively, the visual interface 174 may present a pattern of light or animation on the light ring 178 in response to at least one of a voice command through the audio interface 134 and a user input via the tactile interface 198. In other words, the user can give a voice command or a user input and, in response, the microcontroller 30 controls the LPCB assemblies 182 to convey a message 74. The pattern of light or animation indicates, for example, options selected by the user, estimated time of completion, and/or that the microcontroller 30 is processing the voice command or user input. In various examples, the light may travel in a circular pattern around the light ring 178 to indicate that the microcontroller 30 is processing the voice command or user input.

Referring still to FIG. 12, step 316 includes conveying the voice command to the HMI 58. The microcontroller 30 conveys the information from the voice command to the HMI 58. In a non-limiting example, the information may be conveyed to the HMI 58 at an end of a sequence of voice commands ending with confirmation by the user. Additionally or alternatively, the information may be conveyed to the HMI 58 after each selection by the user (e.g., function, settings for the specified function, etc.). In such examples, the HMI 58 is actively updated by the microcontroller 30 to correspond to the voice commands of the user. The HMI 58 can be updated when the door 26 is in the opened position and when the door 26 is in the closed position.

In step 320, the HMI 58 conveys the user selection (e.g., the information from the voice command) to the controller 96 of the laundry appliance 10. Accordingly, the user-interface system 138 is typically not directly coupled to the controller 96 of the laundry appliance 10. However, the controller 96 is in communication with the microcontroller 30 via the HMI 58. The user selection is relayed from the user-interface system 138 through the HMI 58 to the controller 96. Therefore, the signal regarding the operation of the laundry appliance 10 is received by the user-interface system 138 within the door 26 and conveyed outside the door 26 to the HMI 58 disposed on the cabinet 14. Once the signal is received by the HMI 58, the HMI 58 sends the corresponding signal to the controller 96, which is also disposed within the cabinet 14.

Step 324 includes activating the selected function of the laundry appliance 10 via the controller 96. Step 324 typically includes the user touching the start button 210 of the tactile interface 198 to start the laundry cycle selected via the voice commands. In other words, the user typically selects the laundry cycle and/or options via voice command, the HMI 58 is updated to reflect the voice command, the user touches the start button 210, and the HMI 58 sends a signal to the controller 96 after the user presses the start button 210 indicating the selected operation of the laundry appliance 10.

Referring to FIGS. 1-12, the user can operate the laundry appliance 10 via voice commands. The user can also operate the door 26 via voice commands. In such examples, when a user gives a specified voice command to open the door 26, the MPCB assembly 158 sends a signal to the microcontroller 30, which then sends a corresponding signal to the door opening assembly 190. Accordingly, the microcontroller 30 activates the motor 194 of the door opening assembly 190 to move the door 26 to the opened position in response to a voice command. It is contemplated that the user may move the door 26 to the closed position via voice command.

Referring still to FIGS. 1-12, the user-interface system 138 is disposed on the door 26 of the laundry appliance 10. Typically, the user-interface system 138, including the audio, visual, and tactile interfaces 134, 174, 198, is disposed entirely on the door 26 of the laundry appliance 10. Accordingly, the audio, visual, and tactile interfaces 134, 174, 198 are controlled by the microcontroller 30 disposed on the door 26, separate from the main controller 96 of the laundry appliance 10. In such examples, the proximity sensor 34 is configured to activate the user-interface system 138 on the door 26 via the microcontroller 30 without activating the HMI 58 and/or the controller 96 of the laundry appliance 10. In other words, the user-interface system 138 operates independently of the laundry appliance 10. While illustrated as a laundry appliance 10, it is contemplated that the user-interface system 138 disposed on the door 26 may be included in the door 26 of various appliances, including dishwashers, ovens, refrigerated appliances, countertop appliances, etc.

Use of the present disclosure provides a variety of advantages. For example, a user can select options for laundry cycles via voice command. Also, the user-interface system 138 is typically entirely disposed on the door 26 of the laundry appliance 10. Additionally, the user-interface system 138 is activated in response to the proximity sensor 34. Further, the activation of the user-interface system 138 in response to the proximity sensor 34 is often cost-effective as the user-interface system 138 can be selectively activated when the microcontroller 30 determines the user intends to address the laundry appliance 10. Moreover, the microcontroller 30 can differentiate between a user and a passerby, as well as between a voice command and speech not intended to be a voice command. Additionally, the proximity sensor 34 activates the user-interface system 138 of the door 26 independently of the controller 96 of the laundry appliance 10. Additional benefits or advantages of using this device may also be realized and/or achieved.

The device disclosed herein is further summarized in the following paragraphs and is further characterized by combinations of any and all of the various aspects described therein.

According to at least one aspect, a laundry appliance includes a cabinet. A door is coupled to the cabinet. The door is operable between an opened position and a closed position. An audio interface is disposed on the door. The audio interface includes a microphone for receiving a voice command and a speaker for projecting an audio output. A visual interface is disposed on the door. The visual interface is configured to display a message in response to at least one of the voice command and the audio output. A microcontroller is disposed on the door. The microcontroller is operably coupled to the audio interface and the visual interface. A proximity sensor is configured to communicate sensed information to the microcontroller. The microcontroller is configured to activate at least one of the audio interface and the visual interface in response to the sensed information.

According to another aspect, a tactile interface is disposed on the door. A microcontroller is operably coupled to the tactile interface.

According to another aspect, a door opening assembly includes a motor. The door opening assembly is coupled to the door. A microcontroller is operably coupled to the door opening assembly.

According to another aspect, a human-machine interface is disposed on a front surface of a cabinet. A controller is coupled to the cabinet. The human-machine interface is operably coupled to a microcontroller and the controller.

According to another aspect, a microcontroller is configured to send a signal to a human-machine interface in response to a voice command. The human-machine interface is configured to display information relating to the voice command.

According to another aspect, a human-machine interface is concealed by a door when the door is in a closed position.

According to another aspect, a microcontroller is configured to send a signal to a human-machine interface in response to a voice command. The human-machine interface is configured to send a corresponding signal to a controller corresponding with a function of the laundry appliance.

According to another aspect, a proximity sensor defines a sensor field that extends from a front of a cabinet and a low-distance sensor field that extends from the front of the cabinet. The sensor field extends a greater distance from the front of the cabinet than the low-distance sensor field.

According to another aspect of the present disclosure, a user-interface system for a laundry appliance includes a door. An audio interface is coupled to the door. The audio interface includes at least one microphone to receive a voice command. A proximity sensor is coupled to the audio interface. The proximity sensor defines a sensor field that extends outward from a front surface of the door. A microcontroller is configured to send a signal to the audio interface after a user is detected in the sensor field for a predetermined period of time to activate the at least one microphone.

According to another aspect, at least one microphone includes a plurality of microphones. An audio interface includes the plurality of microphones disposed on a printed circuit board.

According to another aspect, an audio interface includes a locating gasket. A printed circuit board is coupled to the locating gasket.

According to another aspect, a controller is in communication with the microcontroller. A tactile interface for receiving a user input is coupled to the front surface of the door. The microcontroller is configured to send a signal regarding operation of a laundry appliance to the controller in response to a user input.

According to another aspect, a visual interface is coupled to an inner surface of a door. The visual interface includes a light printed circuit board assembly configured to illuminate in response to a signal from a microcontroller.

According to another aspect, a light printed circuit board assembly is configured to display a message in response to a voice command.

According to another aspect of the present disclosure, a door assembly for an appliance includes a door panel. An audio interface is coupled to the door panel. The audio interface is configured to receive a voice command. A tactile interface is coupled to the door panel. The tactile interface is configured to receive a user input. A visual interface is coupled to the door panel. The visual interface is configured to display a message. A microcontroller is coupled to the door panel. The microcontroller is configured to control the visual interface in response to at least one of the voice command and the user input.

According to another aspect, an audio interface includes a plurality of microphones disposed on a printed circuit board and a locating gasket is coupled to the printed circuit board.

According to another aspect, a visual interface includes a plurality of light printed circuit board assemblies. A microcontroller is configured to selectively activate each of the plurality of light printed circuit board assemblies to form a message.

According to another aspect, a message is displayed in response to a voice command.

According to another aspect, a tactile interface includes a capacitive touch feature disposed on a surface of a door panel.

According to another aspect, an audio interface includes a speaker configured to project an audio output in response to a voice command.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A user-interface system for a laundry appliance, comprising:
   a door;
   an audio interface coupled to the door, wherein the audio interface includes a plurality of microphones to receive a voice command, wherein the plurality of microphones are disposed on a printed circuit board that is coupled to a locating gasket;
   a proximity sensor coupled to the audio interface, wherein the proximity sensor defines a sensor field extending outward from a front surface of the door; and
   a microcontroller coupled to an inner surface of the door, wherein the microcontroller is configured to receive sensed information from the proximity sensor, wherein the microcontroller is configured to determine a user intent relating to issuing the voice command in response to the sensed information received by the proximity sensor, and wherein the microcontroller is configured to send a signal to the audio interface after a user is detected in the sensor field for a predetermined period of time to activate the plurality of microphones.

2. The user-interface system of claim 1, further comprising:

a controller in communication with the microcontroller; and a tactile interface for receiving a user input coupled to the front surface of the door, wherein the microcontroller is configured to send a signal regarding operation of said laundry appliance to the controller in response to the user input.

3. The user-interface system of claim 1, further comprising:

a visual interface coupled to the inner surface of the door, wherein the visual interface includes a light printed circuit board assembly configured to illuminate in response to a signal from the microcontroller.

4. The user-interface system of claim 3, wherein the light printed circuit board assembly is configured to display a message in response to the voice command.

5. The user-interface system of claim 1, further comprising:

a human-machine interface having a display coupled to a cabinet, wherein the display is configured to update in response to the voice command.

6. The user-interface system of claim 5, wherein the door is positioned in front of the human-machine interface when the door is in a closed position.

7. The user-interface system of claim 1, wherein the microcontroller is configured to determine that the user intends to issue the voice command when the sensed information includes a gradual decrease in distance between the user and said laundry appliance.

8. The user-interface system of claim 1, wherein the microcontroller is configured to determine that the user is passing by said laundry appliance without issuing the voice command when the sensed information includes at least one of a sharp increase and a sharp decrease in a distance between the user and said laundry appliance.

9. The user-interface system of claim 1, wherein the proximity sensor includes a first sensor field extending from the door and a second sensor field extending from the door, the second sensor field extending a shorter distance from the door relative to the first sensor field to form a low-distance sensor field, and wherein the microcontroller is configured to determine the user intends to issue the voice command when the user is sensed in the low-distance sensor field.

10. A door assembly for an appliance, comprising:

a door panel;

an audio interface coupled to the door panel, wherein the audio interface is configured to receive a voice command;

a tactile interface coupled to the door panel, wherein the tactile interface is configured to receive a user input;

a visual interface coupled to the door panel, wherein the visual interface is configured to display a message;

a proximity sensor coupled to the door panel; and a microcontroller coupled to the door panel, wherein the microcontroller is configured to control the visual interface in response to at least one of the voice command and the user input, and wherein the microcontroller is configured to determine whether a user intends to issue the voice command in response to information received from the proximity sensor.

11. The door assembly of claim 10, wherein the audio interface includes a plurality of microphones disposed on a printed circuit board and a locating gasket coupled to the printed circuit board.

12. The door assembly of claim 10, wherein the visual interface includes a plurality of light printed circuit board assemblies, and wherein the microcontroller is configured to selectively activate each of the plurality of light printed circuit board assemblies to form the message.

13. The door assembly of claim 10, wherein the message is displayed in response to the voice command.

14. The door assembly of claim 10, wherein the tactile interface includes a capacitive touch feature disposed on a surface of the door panel.

15. The door assembly of claim 10, wherein the audio interface includes a speaker configured to project an audio output in response to the voice command.

16. The door assembly of claim 10, wherein the microcontroller is configured to determine that the user intends to issue the voice command when the information from the proximity sensor includes a gradual decrease in distance between the user and the door panel.

17. The door assembly of claim 10, wherein the controller is configured to determine that the user intends to pass by the door panel when the information from the proximity sensor includes at least one of a sharp increase and a sharp decrease in distance between the user and the door panel.

18. The door assembly of claim 17, wherein the controller is configured to determine the user intends to pass by the door panel without issuing the voice command in response to the information.

19. The door assembly of claim 10, wherein the microcontroller is configured to activate the audio interface in response to a signal from the proximity sensor.

20. The door assembly of claim 10, wherein the microcontroller is configured to activate the visual interface in response to at least one of a signal from the proximity sensor and the voice command.

\* \* \* \* \*